UNITED STATES PATENT OFFICE

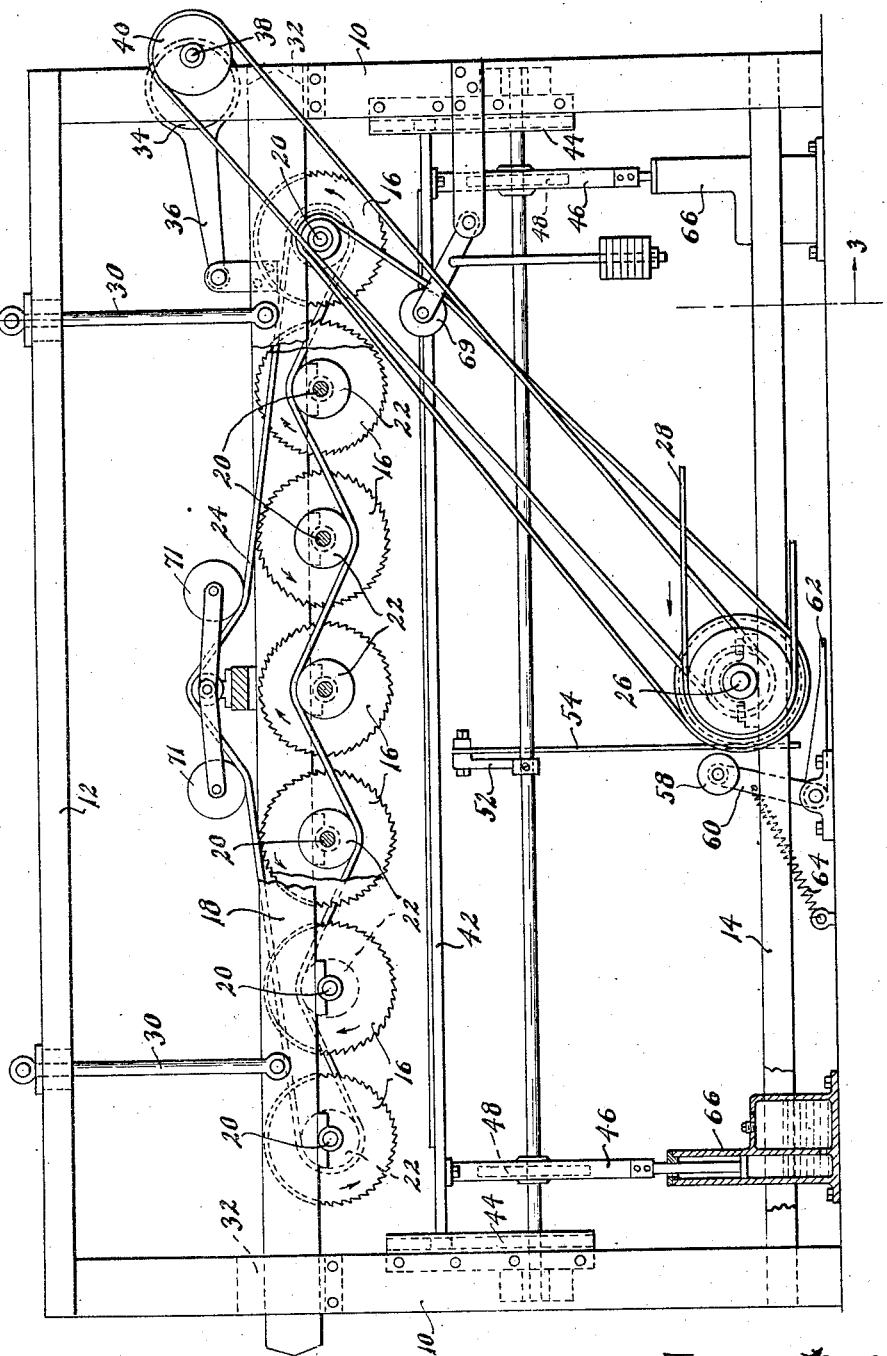

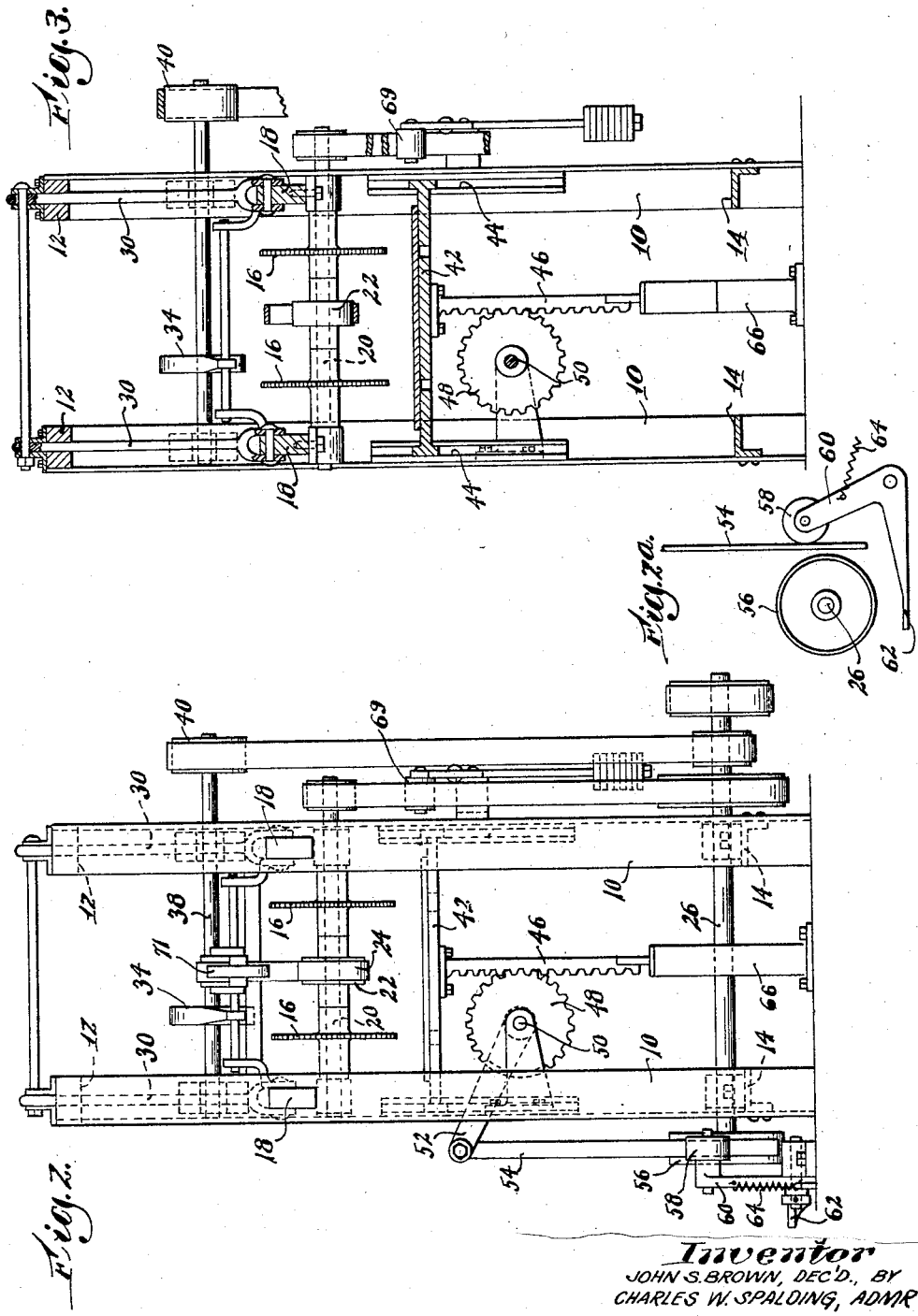

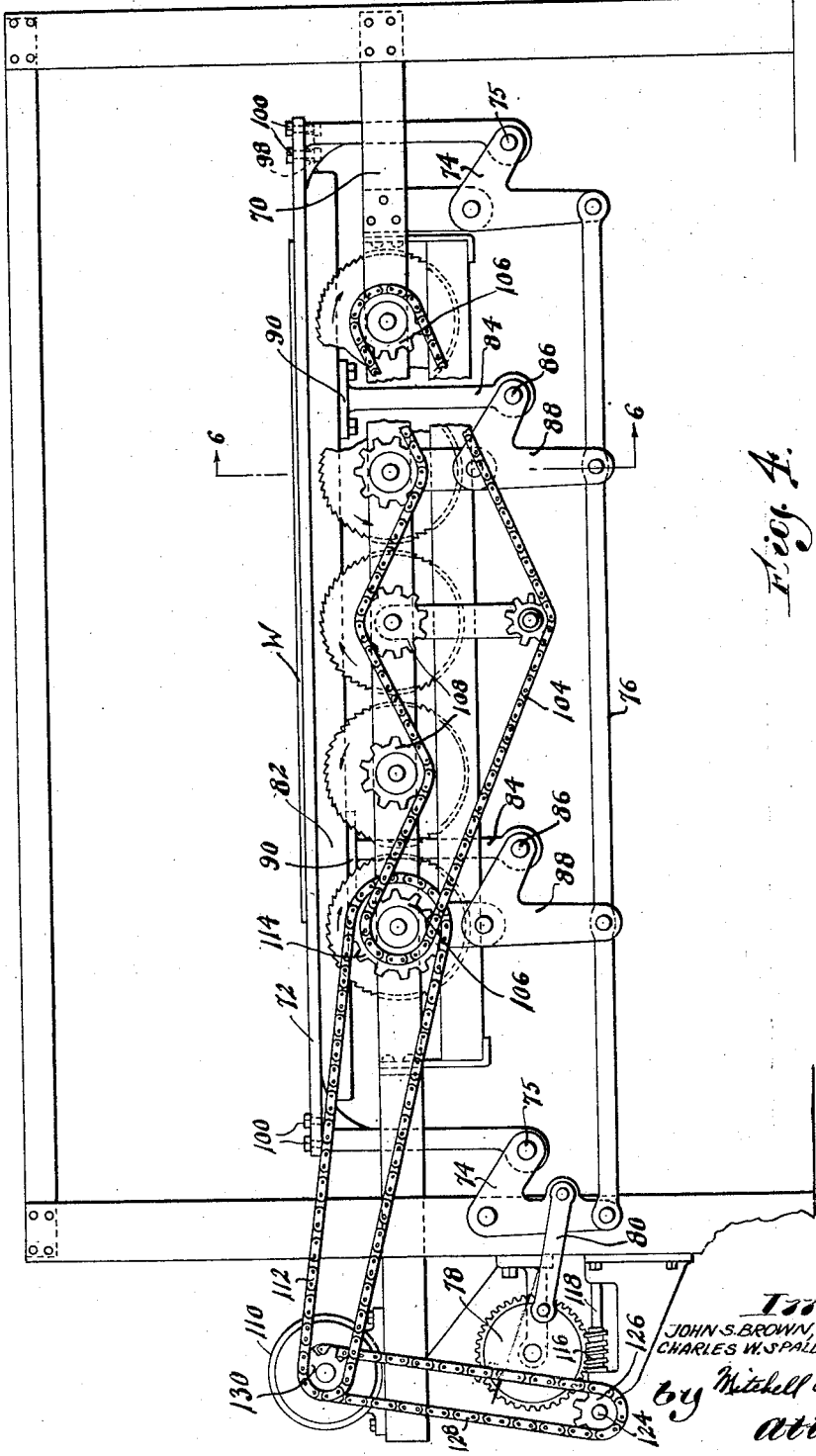

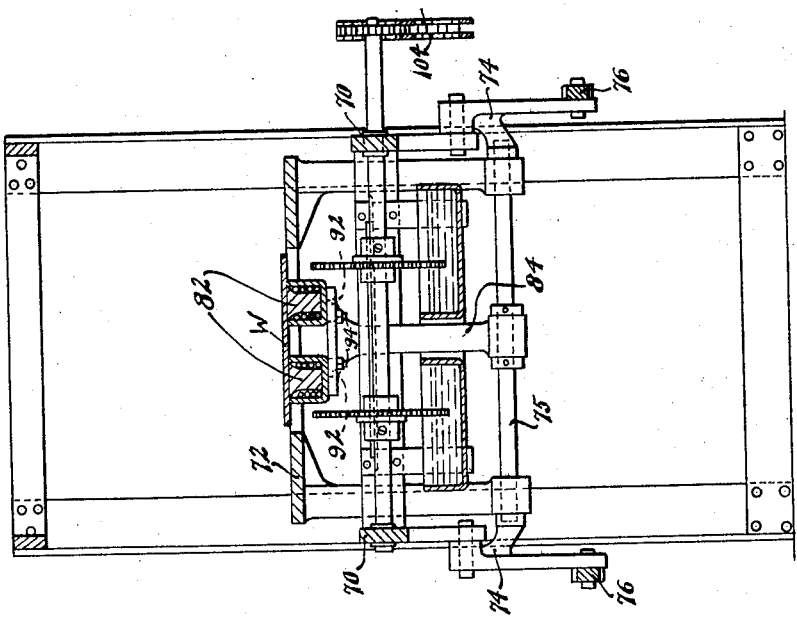

JOHN S. BROWN, DECEASED, LATE OF NEWTON, NEW HAMPSHIRE, BY CHARLES W. SPALDING, ADMINISTRATOR, OF WATERTOWN, MASSACHUSETTS, ASSIGNOR TO EVERETT E. KENT, OF NEWTON, MASSACHUSETTS

METHOD OF AND APPARATUS FOR TOOL OPERATION ON A LONG LINE

Application filed January 28, 1931. Serial No. 511,848.

This invention relates to improvements in methods of and apparatus for tool operation on a long line. More particularly it provides for the making of long straight cuts, for example, in wood, metal and other suitably stiff and substantial materials, without a correspondingly long relative travel being requisite between the tool and the material which is being cut. The apparatus of the invention is herein illustrated as it may be employed for trimming the rough edges from a board, either one edge at a time, or the two side edges simultaneously; and also is illustrated for a similar utility in the manufacture of metal tubing, at that stage where a metal plate is trimmed to have parallel edges which, when the strip thus made is rolled into tubular shape, come uniformly together, to be welded.

Hitherto, so far as he was aware, the making of a long line of tool operation, as a saw cut, in a board or in a sheet of metal has involved the moving of either the saw or the material the full distance of the cut. The operation has been slow and tedious, there is danger of some deviation from a straight line as the work is fed over so long a course, and there is always the danger of injury due to the saw becoming excessively heated, as a result of long and continuous frictional engagement.

The present invention provides, so that long cuts through wood or metal may be made with short travel, with great accuracy, as to straightness; with great saving of time to the operator, compared with what has heretofore been required; and with less danger of damage to saw or to material.

One or a plurality of cuts may be made in a single operation. Whether its length be great or small, the cut may be accomplished in approximately the short space of time required for a saw to eat its way through the board or plate, from one side to the other side thereof. The invention also provides for simultaneous relative movement of the saws and the work in two directions, i. e. through the work and along the work. It is moreover in some cases an important feature that the simultaneous cutting at two edges of a board or other strip assures accuracy with regard to parallelism of the cut edges, and as regards the angle of cut with respect to the plane of the under surface of the work.

The above results are attained by employing a gang of saws arranged in tandem on parallel axes which all extend in the same plane. The saw blades may be aligned all in the same vertical plane, spaced but a little apart at their peripheries; and all may rotate in the same direction or alternate saws may run in opposite directions. A work support is mounted adjacent to the saws; and either the saws or the support will be movable in direction to bring the work and saws into cutting engagement. Also the work and saws can move relatively in longitudinal direction across the saw axes.

When all crests of the gang of saws have risen through the work, each cutting a place for itself, only little longitudinal feed is required to effect a joinder of the individual saw cuts thereby to produce a continuous long cut whose extent is limited only by the number of saws comprising the particular tandem. Two or more such tandems may be arranged in parallelism with a single co-operating work support, or with a support for each one, or for each tandem series. Two or more long cuts may be made simultaneously in this manner, with assurance that the cuts will extend in exact parallelism, and will be square cut as regards the under plane surface of the board or sheet. In the case of sheet metal, cut for being formed into tubes, the cut strips can be rolled to tube shape in any suitable way, and the edges of a strip which are brought together will always fit squarely together to permit, when necessary, a nice welded joint.

The invention is illustrated herein as it may be applied to two different uses, both of which as it happens, are for cutting with saws, and for making the cut in a straight line; but the invention is not necessarily thus limited in its utility. It may be applied with tools other than saws, not necessarily cutting all of the way through the work; and it may be applied on a line other than straight, in cases where the feed and setting of tools is such that the end path of one tool in the work runs into the beginning path of the next tool, so as to make the desired continuous effect.

It is intended that the patent shall cover by suitable expression in the appended claims, whatever features of patentable novelty exist in the invention disclosed.

In the accompanying drawings, which may be considered to be more or less diagrammatical, Figure 1 is an elevation of a device especially adapted for edge-trimming boards, embodying features of the invention;

Figure 2 is an end elevation looking from the right in Figure 1;

Figure 2a is a detail elevation of a fragment of Figure 1, showing the means for elevating the work support;

Figure 3 is an elevation, in section on 3—3 of Figure 1;

Figure 4 is an elevation of a modified form which is adapted particularly for handling sheet metal;

Figure 5 is an end elevation looking from the left in Figure 4; and

Figure 6 is an elevation, in section on 6—6 of Figure 5.

Referring to the drawings, and more particularly to Figures 1–3 which show the invention applied for trimming a board to a straight edge, four uprights 10 constituting legs, and upper and lower crossbars 12, 14, connecting the uprights, make a frame on which two series of circular saws 16 are mounted. All the saws of each series are journalled on one saw rail 18, the saws on each rail being arranged in tandem, their axes being parallel in one horizontal plane. The saw rails 18 are parallel, and each rail carries seven saws 16 mounted on their respective saw shafts 20. As illustrated, each shaft 20 carries and drives one saw of each of the two tandems, and is itself driven by a pulley 22 located between the saws, in turn driven by a belt 24 which is in engagement with all of the series of pulleys 22. Power may be supplied in any suitable way, as for example through one of the end shafts 20 by belt connection from a shaft 26 below, driven by belt 28 from any suitable source.

The saw rails 18 are movably suspended by links 30 to swing from the upper bars 12. The ends of the rails project into slots 32 provided in the uprights 10, which slots constitute guides for the rails to prevent side sway. An eccentric 34, connected by its arm 36 to one of the rails, transmits a reciprocatory swinging motion to the rails in the direction of their length. The eccentric may have on its shaft 38 a pulley 40 for belt drive from the shaft 26.

A work support is indicated at 42, mounted for vertical movement in guides 44 on the uprights 10. At each end the support 42 has a rack 46 depending from it; and gears 48, 48 on operating shaft 50 are in mesh, each with one of the racks. Conveniently located along shaft 50 is an operating arm 52 carrying at its end a flexible strip 54 of material which may be leather, metal or other material which is suitably tough and durable. This strip 54 hangs loosely down adjacent to the periphery of pulley 56 on the end of shaft 26. A loose wheel 58 on one arm of a bell-crank 60, adjacent the pulley 56, is adapted to be moved, by depression of foot pedal 62 on the bell crank, into engagement with the strip 54 to press the latter against pulley 56. Inasmuch as pulley 56 is continually rotating counter-clockwise, as viewed in Figure 1, (clockwise as viewed in Figure 2a) engagement of the strip 54 between it and wheel 58 causes a downward pull on the strip with consequent raising of work support 42 to bring the work into engagement with the saws. A spring 64 may be provided for returning wheel 58 as soon as the foot-pedal is released. Hydraulic cushioning devices 66, or other retarding mechanism, may be provided for easing the fall of the work support when the foot pedal is released.

In an arrangement of the class of that of Figures 1–3, where the saws are movably mounted, the belt for driving the saws preferably will be trained over an idler pulley 69 which may be weighted or spring-pressed in a manner to maintain the belt always operatively tight while permitting the described swinging or other reciprocatory movement of the saw rails. And the idler pulleys 71 maintain belt 24 always tight.

In the embodiment of the invention seen in Figures 4–6, the saw rails 70 are fixed, and the work support 72, here arranged above the saws, is movable toward and from the saws, and also along their direction of alignment. The support is here illustrated as being mounted on bell-cranks 74, one of a pair being at each side, at one end of the support; and one of a pair being at each side at the other end of the support. Cross-rods 75, on which the bell-cranks are pivotally mounted, connect the bell-cranks of each end pair; and longitudinal bars 76 connect the end pairs together, so that all move in unison. An eccentric 78 may be employed to rock the bell-cranks through the medium of connecting rod 80, thereby to raise or lower the support as they swing while simultaneously moving it along the line of saws.

The work W, in this case, may be secured to the support in any suitable way, as by suitably arranged clamping devices, or one or more magnetic chucking devices. For this purpose the drawings represent, more or less diagrammatically, a magnetic chuck 82 extending substantially the full extent of the support. This is in two sections adapted for adjustment laterally toward and from each other, according as the saws are spread. The chuck is secured to the work support at each end and is supported along its extent by two arms 84 pivotally mounted on cross rods 86 supported on bell-cranks 88. These latter bell-cranks are aligned with the bell-cranks 74 and are connected to the connecting bars 76 so that both sets of bell-cranks work in unison.

The upper ends of arms 84 present flat tubular surfaces 90 as rests for chuck 82, and these surfaces have slots 92 through which extend depending bolts 94 on the chuck-sections, so that the latter may be clamped securely to the arms 84, or may be readily adjusted along the table slots 92 as occasion requires Similar adjusting means are provided at the end connections of chuck to work support, the support being slotted as at 98 to receive the bolts 100 which can clamp the chuck to the support when tightened.

In the form seen in Figures 4–6 a more positive drive is employed, illustrated as of chain and sprocket type, with the endless chain 104 passing over the end sprockets 106 and under and over alternate intermediate sprockets 108, to rotate alternate saws in opposite directions. A motor 110 may furnish power for the saws, through chain 112 trained around a sprocket 114 on the saw shaft at one extreme end of the tandem.

The eccentric 78 for operating the work support, may be driven in any suitable manner. It is illustrated as a worm gear in mesh with worm 116 on a shaft 118 whose end carries a bevel gear 120. This bevel gear 120 is in mesh with another bevel gear 122 on a shaft 124 which is mounted at right angles to shaft 118 and in the same plane. Shaft 124 has sprocket 126 secured thereon, over which a sprocket chain 128 is trained. A similar sprocket wheel 130 on the motor shaft, effects rotation of the eccentric; and thus causes movement of the work support simultaneously with rotation of the saws.

The invention provides for executing long operations, as cuts, in wood, metal or other materials quickly, easily and safely. With either of the illustrated forms, the work comes into engagement with all the saws of a series at once, and each saw makes a short cut in the material. Either the saws, as in Figures 1–3, or the work, as in Figures 4–6, may be moved in longitudinal direction to extend the cutting linearly through the adjacent space between the series of cuts thus initially made. As a result the short cuts of a series merge into one long cut; and, by multiplying the series, a plurality of parallel long cuts may be made simultaneously.

Obviously, it is not necessary that the operation of the tools-in-tandem on the work be a saw cut. The tools-in-tandem and in fixed alignment may for example be suitable for planing, milling or channelling. While if saws be used the cut may make only a straight channel or straight groove. In the case of wood, the tools may be molding tools. Where the tools are not to penetrate completely through the work the apparatus illustrated will be suitably modified so that after attaining the desired depth of cut the further straight travel of the tools in alignment merely maintains the attained depth.

What is claimed as the invention is:

1. The method of making a long cut in sheet material, comprising the cutting of the sheet to the full ultimate depth of the cut at a plurality of separated aligned locations simultaneously, the alignment being that of the desired long cut; and the extending of these cuts, by relative movement of material and cutters along the said alignment, until the said plurality of cuts become merged into and constitute the said long cut whereby the cut as a whole is composed of an aligned series of separate coordinate cuts.

2. The method of cutting sheet material into strips comprising the cutting of slits therethrough, separated and in tandem, simultaneously, and the extending of the slits simultaneously until they unite to form a single long slit which is composed of an aligned series of separate coordinate slits, and thus completely sever a strip from the sheet.

3. Mechanism for making a compositely continuous rectilinear cut in sheet material, approximately perpendicular to the face of the sheet, comprising a plane-faced work-bed for holding the sheet material; a series of cutters; a support whereon the cutters are fixedly positioned relative to each other and are in tandem paralled to the line on which the rectilinear cut is to be made; and means for relatively moving the work-bed and the cutters, thereby guiding the cutters into the work in a direction which lies in a plane approximately perpendicular to the sheet of work on the bed, to the full ultimate depth of the cut, and also moving the cutters in the work along the line of cutters; said moving means having a stroke whose length is less than the whole length cut in the sheet by the cutters; and the length of stroke being such that, when a cutter has progressed in the stroke along the said rectilinear line to a position at which its next adjacent tandem cutter was at the beginning of the same stroke, the whole of the said composite continuous cut in the work is completed.

4. Saw mechanism comprising a series of circular saws mounted as a composite operating unit, in tandem along a line with individual saws in the series rotating in opposite directions; a work support adjacent to the saws; and means for bringing together the work and the unit of tandem saws, with the saws entering the face of the work, and also with feed in direction along the tandem line; the said oppositely rotating saws being organized and driven for cutting simultaneously, whereby the endwise-displacing thrusts of one individual saw on the work tend to neutralize the endwise displacing thrusts of another of the individual saws, rotating oppositely.

5. Saw mechanism comprising a rail; a plurality of circular saws mounted in tandem thereon; a swinging support for said rail; a work support adjacent; and means for moving the work into the swing path of the saws.

6. Mechanism for making long straight cuts, comprising a plurality of cutters arranged in horizontal tandem; a horizontal work support adjacent to the cutters having slots through which said cutters can operate; and means for moving said support, while it continues horizontal, laterally toward the cutters simultaneously with relative longitudinal movement.

7. Mechanism for trimming sheet material comprising a cutter support and a plurality of cutters fixed in position thereon with parallel axes and in tandem alignment; a work support adjacent to the line of cutters; means for clamping the sheet material on said work support; and means for moving the said supports relatively to each other in a direction transverse of said alignment, to the full ultimate depth of the cut, and for moving said supports relatively to each other in direction along the line of cutters a distance sufficient to merge the initial cuts, for completing the cutting operation.

Signed at Boston, Massachusetts, this twenty-sixth day of November 1930.

CHARLES W. SPALDING,
*Administrator of the Estate of John S. Brown, Deceased.*